(12) United States Patent
Fujimoto et al.

(10) Patent No.: US 7,919,016 B2
(45) Date of Patent: Apr. 5, 2011

(54) CONDUCTIVE TIN OXIDE SOL AND PROCESS FOR PRODUCING SAME

(75) Inventors: Osamu Fujimoto, Sodegaura (JP); Osamu Tanegashima, Sodegaura (JP); Yoshinari Koyama, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 12/662,589

(22) Filed: Apr. 23, 2010

(65) Prior Publication Data

US 2010/0207076 A1 Aug. 19, 2010

Related U.S. Application Data

(62) Division of application No. 11/812,504, filed on Jun. 19, 2007, now abandoned.

(30) Foreign Application Priority Data

Jun. 22, 2006 (JP) .................................. 2006-172121
Jul. 27, 2006 (JP) .................................. 2006-204521

(51) Int. Cl.
*H01B 1/08* (2006.01)

(52) U.S. Cl. ..................................... 252/520.1; 423/618

(58) Field of Classification Search ............... 252/520.1; 423/92, 618

See application file for complete search history.

(56) References Cited

U.S. PATENT DOCUMENTS

| | | | |
|---|---|---|---|
| 4,514,322 A | 4/1985 | Swoboda | |
| 4,937,148 A | 6/1990 | Sato et al. | |
| 5,013,607 A | 5/1991 | Sato et al. | |
| 5,204,177 A | * | 4/1993 | Sato et al. ...................... 428/328 |
| 5,376,308 A | 12/1994 | Hirai et al. | |
| 5,776,239 A | 7/1998 | Bruno | |
| 5,776,373 A | 7/1998 | Bergmann et al. | |
| 6,632,276 B1 | 10/2003 | Vogt | |
| 6,787,231 B1 | 9/2004 | Furman et al. | |
| 2005/0048262 A1 | 3/2005 | Nakagawa et al. | |
| 2005/0083450 A1 | 4/2005 | Motomura et al. | |
| 2006/0221451 A1 | 10/2006 | Ohishi et al. | |

FOREIGN PATENT DOCUMENTS

| | | |
|---|---|---|
| EP | 0 551 744 A1 | 7/1993 |
| EP | 0 582 371 A1 | 2/1994 |
| EP | 0582371 * | 2/1994 |
| EP | 1870439 * | 12/2007 |
| JP | A-62-230617 | 10/1987 |
| JP | A-63-011519 | 1/1988 |
| JP | B2-02-032213 | 7/1990 |
| JP | A-6-092636 | 4/1994 |
| WO | WO 01/81466 A1 | 11/2001 |

OTHER PUBLICATIONS

Apr. 9, 2010 European Search Report issued in EP 07 01 2264.

* cited by examiner

*Primary Examiner* — Mark Kopec
(74) *Attorney, Agent, or Firm* — Oliff & Berridge, PLC

(57) ABSTRACT

There is provided a conductive tin oxide sol having a high transparency, and a process for producing the sol, a coating composition by use of the sol and a material coated with the coating composition. The conductive tin oxide sol containing phosphorus-doped conductive tin oxide colloidal particles (A), wherein a sol prepared so as to have the colloidal particles (A) in a concentration of 10 mass % in the sol has a transmittance of 30% or more at a wavelength of 600 nm in an optical path length of 10 mm. The particle diameter of the conductive tin oxide sol by observation with transmission electron microscope is 2 to 25 nm. The molar ratio of the doped phosphorus (P) to the tin oxide ($SnO_2$) in the colloidal particles (A) is 0.005 to 0.2. The conductive tin oxide sol is produced by mixing a phosphorus compound in a tin oxide sol, and then subjecting to a hydrothermal treatment. The coating composition contains the conductive tin oxide sol and a binder. The material having a coating film formed from the coating composition is also provided.

5 Claims, No Drawings

_US 7,919,016 B2_

CONDUCTIVE TIN OXIDE SOL AND PROCESS FOR PRODUCING SAME

This is a Division of application Ser. No. 11/812,504 filed Jun. 19, 2007 now abandoned, which which claims priority to Japanese Patent Application Nos. 2006-172121 (filed on Jun. 22, 2006) and 2006-204521 (filed on Jul. 27, 2006). The disclosures of the prior applications are hereby incorporated by reference herein in their entirety.

BACKGROUND OF THE INVENTION

1. Field of the Art

The present invention relates to a conductive tin oxide sol and a process for producing the same, and further a coating composition by use of the conductive tin oxide sol and a covering material by use of the coating composition.

2. Description of the Related Art

As tin oxide having electrical conductivity, tin oxide containing antimony, that is, antimony-doped conductive tin oxide (ATO) is known. Although ATO is excellent in electrical conductivity, recently the toxicity of antimony and intense coloration (blue-black) resulting from antimony become problems, and therefore conductive materials containing no antimony are desired. Thus, several conductive tin oxides in which alternative elements such as phosphorus, fluorine, or the like is doped instead of antimony are proposed.

Conductive tin oxide containing no antimony is produced by for example any of the following methods:

a method in which a liquid prepared by dissolving germanium, phosphorus, lithium and zinc in a tin chloride solution is added in an alkaline aqueous solution to form a precipitate, and the precipitate is calcined at 350 to 700° C. (see, JP-B 2-32213 (1990));

a method in which a soluble phosphorus compound is added in a hydrous tin oxide precipitate prepared by reacting an acid or an alkali with a tin compound solution to form a precipitate, and the precipitate is calcined at 800 to 1300° C. (see, JP-A 6-92636 (1994)); and a method in which an aqueous solution of a tin compound is subjected to hydrolysis of the tin compound by keeping the solution at pH 8 to 12 to form a sol containing colloidal particles of a metal oxide and/or a hydrous oxide, the colloidal particles are recovered from the sol, and then at least one aqueous solution of an antimony compound, a phosphorus compound and a fluorine compound is impregnated therein, dried and calcined (see, JP-A 63-11519 (1988)).

In these methods, as powders are obtained by calcining at a high temperature of 350 to 1300° C. in order to acquire electric conductivity, the dispersion properties thereof are not good, and thereby these powders are finely divided to a particle size not less than about 0.05 to 0.4 micrometer even by using a normal grinding means.

In recent years, in order to make transparent plastics antistatic, antistatic coatings with a high transparency that does not injure the transparency of substrates are required, but the coating films by use of the above-mentioned powders cannot provide a high transparency.

In addition, a sol of conductive tin oxide is prepared by heating tin oxide powders that are doped with a small amount of alternative elements such as antimony, fluorine, phosphorus, tellurium, bismuth, cadmium, or the like in an acid aqueous solution or an alkaline aqueous solution at 30 to 200° C. (see, JP-A 62-230617 (1987)).

However, as the calcination at a temperature of 350° C. or more in the process of doping alternative elements is carried out, the average particle diameter of dispersed particles contained in the obtained sol is not less than about 0.03 to 0.10 micrometer. This process cannot provide highly transparent coating films.

SUMMARY OF THE INVENTION

Therefore, the present invention provides a conductive tin oxide sol having a high transparency that was not conventionally present, and a process for producing the sol, a coating composition by use of the sol and a material coated with the coating composition.

The present invention includes the following aspects:

as a first aspect, a conductive tin oxide sol containing phosphorus-doped conductive tin oxide colloidal particles (A), wherein a sol prepared so as to have the colloidal particles (A) in a concentration of 10 mass % in the sol has a transmittance of 30% or more at a wavelength of 600 nm in an optical path length of 10 mm;

as a second aspect, the conductive tin oxide sol set forth in the first aspect, wherein the particle diameter of the conductive tin oxide sol by observation with transmission electron microscope is 2 to 25 nm;

as a third aspect, the conductive tin oxide sol set forth in the first or second aspect, wherein the molar ratio of the doped phosphorus (P) to the tin oxide ($SnO_2$) in the colloidal particles (A) is 0.005 to 0.2;

as a fourth aspect, a process for producing the conductive tin oxide sol set forth in any one of the first to third aspects, comprising mixing a phosphorus compound in a tin oxide sol, and then subjecting to a hydrothermal treatment;

as a fifth aspect, the process for producing the conductive tin oxide sol set forth in the fourth aspect, wherein a temperature for the hydrothermal treatment after mixing the phosphorus compound in the tin oxide sol is 100 to 350° C.;

as a sixth aspect, the process for producing the conductive tin oxide sol set forth in the fourth or fifth aspect, wherein the tin oxide sol is prepared by adding metal tin and hydrogen peroxide in an aqueous solution of an organic acid keeping $H_2O_2/Sn$ molar ratio of 2 to 3, and reacting;

as a seventh aspect, the process for producing the conductive tin oxide sol set forth in the sixth aspect, wherein the metal tin and hydrogen peroxide are added and reacted so that tin oxide concentration in the aqueous solution of an organic acid is 40 mass % or less;

as an eighth aspect, the process for producing the conductive tin oxide sol set forth in the sixth or seventh aspect, wherein the organic acid is oxalic acid or an organic acid containing oxalic acid as a main component;

as a ninth aspect, the process for producing the conductive tin oxide sol set forth in the fourth or fifth aspect, wherein the phosphorus compound is at least one phosphorus compound selected from the group consisting of orthophosphoric acid, sodium dihydrogen phosphate, disodium hydrogen phosphate, trisodium phosphate, ammonium dihydrogen phosphate, diammonium hydrogen phosphate, triammonium phosphate, phosphorous acid, sodium dihydrogen phosphite, disodium hydrogen phosphite, trisodium phosphite, phosphorus trichloride and phosphorus pentachloride;

as a tenth aspect, a coating composition comprising the conductive tin oxide sol set forth in any one of the first to third aspects, and a binder;

as an eleventh aspect, the coating composition as set forth in the tenth aspect, wherein the binder is at least one selected from the group consisting of an acrylic resin, a polyester resin, an urethane resin, an epoxy resin, a polyvinyl alcohol resin, a melamine resin, gelatin and a gelatin derivative, cellulose and a cellulose derivative, a polyimide resin, a phenol resin, an organic silicon compound, a urea resin, a diallylphthalate resin and a butyral resin;

as a twelfth aspect, a material having a coating film formed from the coating composition as set forth in the tenth or eleventh aspect;

as a thirteenth aspect, the material as set forth in the twelfth aspect, wherein the material is plastic, rubber, glass, metal, ceramics or paper; and as a fourteenth aspect, a material having an anti-reflective coating, further providing an anti-reflective coating on the material as set forth in the twelfth or thirteenth aspect.

The conductive tin oxide sol according to the present invention contains phosphorus-doped conductive tin oxide colloidal particles (A), wherein a sol prepared so as to have 10 mass % of the colloidal particles (A) in the sol has a transmittance of 30% or more at a wavelength of 600 nm in an optical path length of 10 mm, and the conductive tin oxide sol is a sol having a high transparency and antistatic properties that was not conventionally present, and the dried coating film obtained therefrom shows a high refractive index of about 1.8 or more, and is excellent in water resistance, humidity resistance, light resistance, weathering resistance, heat resistance, abrasion resistance and the like.

The conductive tin oxide sol according to the present invention has a particle diameter by observation with transmission electron microscope of 2 to 25 nm. The conductive tin oxide sol prepared by heating tin oxide powders that are doped with a small amount of alternative elements such as antimony, fluorine, phosphorus, tellurium, bismuth, cadmium, or the like in an acid aqueous solution or an alkaline aqueous solution that was conventionally reported has an average particle diameter of dispersed particles ranging from about 0.03 to 0.10 micrometer. Therefore, the particle diameter of the colloidal particles (A) in the conductive tin oxide sol according to the present invention is extremely fine.

The coating composition prepared by mixing the conductive tin oxide sol of the present invention and the binder can form a conductive coating film with a high transparency by coating it on a substrate. If the substrate is a transparent substrate, a material having a conductive or antistatic coating film can be produced without injuring the transparency of the substrate. The conductive coating film prepared by use of the conductive tin oxide sol of the present invention has a surface resistance ranging from $10^5$ to $10^{10}\Omega/\square$, and has a good conductivity and an excellent antistatic property.

In addition, as the appearance of the conductive tin oxide sol according to the present invention is a pale yellow to almost colorless transparent liquid, the resulting transparent conductive coating film is almost colorless and transparent and therefore has no defect such as coloration (blue coloration) of coating film that ATO shows.

DESCRIPTION OF THE PREFERRED EMBODIMENTS

The conductive tin oxide sol according to the present invention contains phosphorus-doped conductive tin oxide colloidal particles (A), wherein a sol prepared so as to have 10 mass % of the colloidal particles (A) in the sol has a transmittance of 30% or more at a wavelength of 600 nm in an optical path length of 10 mm. The particle diameter of the colloidal particles (A) in the sol by observation with transmission electron microscope is 2 to 25 nm.

The molar ratio of the doped phosphorus to the tin oxide ($SnO_2$) in the colloidal particles (A) is 0.005 to 0.2. When the molar ratio is less than 0.005, sufficient conductivity cannot be obtained and therefore it is not preferable. On the other hand, when the molar ratio is more than 0.2, it is not efficient as a part of phosphorus component of the mixed phosphorus compound becomes a surplus and is not doped. The phosphorus compound mixed in the tin oxide aqueous sol includes orthophosphoric acid, sodium dihydrogen phosphate, disodium hydrogen phosphate, trisodium phosphate, ammonium dihydrogen phosphate, diammonium hydrogen phosphate, triammonium phosphate, phosphorous acid, sodium dihydrogen phosphite, disodium hydrogen phosphite, trisodium phosphite, phosphorus trichloride and phosphorus pentachloride, etc.

The tin oxide colloidal particles used as seed particles for the production of tin oxide sol being a starting material in the present invention can be easily produced in a form of sol of colloidal particles having a particle diameter of about 4 to 50 nm by any known methods such as ion exchange method, peptization method, hydrolysis method, reaction method, or the like.

The ion exchange method includes for example a method in which a stannate such as sodium stannate is treated with a hydrogen type cation exchange resin, or a method in which tin (II) salt such as tin (II) chloride, tin (II) nitrate, or the like is treated with a hydroxy type anion exchange resin. The peptization method includes for example a method in which tin (II) hydroxide gel prepared by neutralizing a tin (II) salt with a base or neutralizing stannic acid with hydrochloric acid is washed and then peptized with an acid or a base. The hydrolysis method includes for example a method in which tin alkoxide is hydrolyzed, or a method in which a basic tin (II) chloride is hydrolyzed under heating and then acids that are useless are excluded. The reaction method includes for example a method in which metal tin powders are reacted with an acid.

As tin oxide sol as a starting material in the present invention, it is preferable to use a tin oxide sol prepared by a method in which metal tin and hydrogen peroxide is added in an organic acid aqueous solution keeping $H_2O_2/Sn$ molar ratio of 2 to 3, and reacted to form tin oxide colloidal particles. In particular, it is the most preferable to use an acidic tin oxide sol prepared by a method in which hydrogen peroxide water and metal tin and hydrogen were added in an organic acid aqueous solution containing oxalic acid or oxalic acid as a main component in an tin oxide concentration in the aqueous solution of 15 to 40 mass %, keeping $H_2O_2/Sn$ molar ratio of 2 to 3, and reacted with each other to form tin oxide colloidal particles. When the tin oxide concentration in the aqueous solution is more than 40 mass %, undissolved material is precipitated, the viscosity becomes too high and it becomes difficult to stir, thereby it is not preferable.

The organic acid aqueous solution is an organic acid aqueous solution containing oxalic acid or oxalic acid as a main component, and preferably is oxalic acid aqueous solution. The organic acid aqueous solution containing oxalic acid is an aqueous solution of an organic acid containing oxalic acid in an amount of 80 mass % or more based on the total organic acid, and the reminder can be organic acids such as formic acid, acetic acid and the like. The organic acid aqueous solution can be used in an organic acid concentration of 1 to 30 mass %, more preferably 4 to 10 mass %. The tin oxide sol prepared by the above-mentioned method is acid, and has pH of 3 or less. The tin oxide colloidal particles prepared by the above-mentioned method have a particle diameter observed with transmission electron microscope of about 20 nm or less.

The tin oxide sol that is a starting material in the present invention may be either an aqueous sol or a hydrophilic organic solvent sol, and the aqueous sol is preferable. In addition, the tin oxide sol suitably has pH that makes the sol stable, generally both acidic tin oxide sols having pH of 0.1 to 7 or alkaline tin oxide sols having pH of 7 to 11.5 can be used, and it is preferable to use alkaline tin oxide aqueous sols in order to obtain conductive tin oxide sols with a higher transparency and a good conductivity. The concentration of the used tin oxide sol is about 0.5 to 50 mass %, preferably 1 to 30 mass % in tin oxide concentration.

The concentration of the tin oxide sol of the present invention can be determined from calcined residue obtained by preliminarily drying a tin oxide sol at 110° C. and maintaining in air at 600° C. for 3 hours.

The alkaline tin oxide aqueous sol can be prepared by adding in the acidic tin oxide aqueous sol, a basic compound for example an alkyl amine such as ethyl amine, diethyl amine, n-propyl amine, isopropyl amine, diisopropyl amine, dipropyl amine, n-butyl amine, isobutyl amine, diisobutyl amine, triethyl amine, benzyl amine, etc., an alkanol amine such as monoethanol amine, triethanol amine, etc., a quaternary ammonium hydroxide such as a guanidine hydroxide, tetramethylammonium hydroxide, tetraethylammonium hydroxide, etc., a carbonate such as ammonium carbonate and guanidine carbonate.

The conductive tin oxide sol of the present invention is prepared by mixing a phosphorus compound in a tin oxide aqueous sol, and then subjecting to a hydrothermal treatment. The tin oxide aqueous sol mixed with the phosphorus compound is placed in a pressure-resistant container, and subjected to hydrothermal treatment at a predetermined temperature and thereby phosphorus ion is subjected to solid-solution in the tin oxide under a high temperature and a high pressure to give a phosphorus-doped tin oxide having conductivity. The temperature for the hydrothermal treatment is 100 to 350° C., preferably 110 to 300° C., more preferably 120 to 250° C. When the hydrothermal treatment is carried out at a temperature less than 100° C., phosphorus is not completely doped and a sufficient conductivity is not obtained and further the resulting sol shows a low stability in a range of pH of 0.1 to 7.

The conductive tin oxide sol prepared according to the present invention is subjected to hydrothermal treatment in the process for doping phosphorus, and is not subjected to any calcination process at a high temperature. Therefore, particle growth due to sintering in the calcination does not occur, and thus large particles are not formed, and the particle diameter by observation with transmission electron microscope is 2 to 25 nm. The appearance of the sol is a pale yellow to colorless transparent. In addition, the aqueous sol after the hydrothermal treatment keeps a state of an aqueous sol, and thus the use of apparatus for grinding or dispersing such as dry grinding, wet grinding with media, ultrasonic homogenizer dispersion, pressure homogenizer or the like is not required, and therefore the contamination of impurities does not occur.

The contact of the conductive tin oxide aqueous sol according to the present invention with an anion exchange resin can lead to removal of unreacted phosphorus ion and give a stable alkaline conductive tin oxide aqueous sol. Further, the contact with a cation exchange resin can give an acidic conductive tin oxide aqueous sol. The resulting conductive tin oxide aqueous sol can be subjected to the replacement of water being disperse medium by an organic solvent to form a conductive tin oxide organic solvent sol.

The conductive tin oxide aqueous sol or organic solvent sol can be stabilized as a sol by adding an acid and/or a base if necessary.

The acid that can be used includes an inorganic acid such as hydrochloric acid, nitric acid, etc., an aliphatic oxy acid such as oxalic acid, lactic acid, tartaric acid, malic acid, citric acid, glycolic acid, hydroacrylic acid, α-oxy butyric acid, glyceric acid and tartoronic acid.

The base that can be used includes ammonia, an alkali metal hydroxide, an organic base for example an alkyl amine such as ethyl amine, diethyl amine, n-propyl amine, isopropyl amine, diisopropyl amine, dipropyl amine, n-butyl amine, isobutyl amine, diisobutyl amine, triethyl amine, benzyl amine, etc., an alkanol amine such as monoethanol amine, triethanol amine, etc., a quaternary ammonium hydroxide such as guanidine hydroxide, tetramethylammonium hydroxide, tetraethylammonium hydroxide, etc., a carbonate such as ammonium carbonate and guanidine carbonate.

The organic solvent that can be used includes alcohols such as methyl alcohol, ethyl alcohol, propyl alcohol, 2-propyl alcohol, butyl alcohol or the like, glycols such as ethylene glycol, diethylene glycol, hexylene glycol or the like, ethers such as methyl cellosolve, ethyl cellosolve or the like, ketones such as methyl ethyl ketone or the like, esters such as isobutyl acetate, isopropyl acetate, isopentyl acetate, ethyl acetate, butyl acetate, propyl acetate, pentyl acetate or the like, hydrocarbons such as xylene, toluene or the like.

Further, in order to improve dispersion properties in the organic solvent, anionic, cationic or nonionic surfactants can be used. In order to improve dispersion properties, resin type pigment dispersants having an acid functional group can be used. The resin type pigment dispersants having an acid functional group that can be used may be commercially available ones, they include for example Disperbyk-106 (trade name, by manufactured by BYK Japan KK; component: polymer salt having acid group), Disperbyk-108 (trade name, by manufactured by BYK Japan KK; component: carboxylic acid ester having hydroxy group), Disperbyk-110 (trade name, by manufactured by BYK Japan KK; component: copolymer having acid group), Disperbyk-111 (trade name, by manufactured by BYK Japan KK; component: copolymer having acid group), Disperbyk-112 (trade name, by manufactured by BYK Japan KK; component: acrylic copolymer), Disperbyk-116 (trade name, by manufactured by BYK Japan KK; component: acrylic copolymer), Disperbyk-142 (trade name, by manufactured by BYK Japan KK; component: phosphate of copolymer), Disperbyk-180 (trade name, by manufactured by BYK Japan KK; component: alkyl ammonium salt of block copolymer), Disperbyk-2000 (trade name, by manufactured by BYK Japan KK; component: modified acrylic block copolymer), Disperbyk-2001 (trade name, by manufactured by BYK Japan KK; component: modified acrylic block copolymer), or the like to which the present invention is not limited.

The conductive tin oxide sol of the present invention can be mixed with other conductive metal oxide sols. The conductive metal oxide sols that can be used include for example antimony-doped tin oxide sol, zinc antimonate sol or the like. The mixing of the conductive metal oxide sol with the conductive tin oxide sol of the present invention enables to reduce blue-black color that the conductive metal oxide shows keeping conductivity, and thereby transparency can be improved.

The coating composition comprising the conductive tin oxide sol of the present invention and a binder is suitable for producing a coating film having transparent conductivity, transparent antistatic properties or a high refractive index. The used binder is not specifically limited and is preferably an acrylic resin, a polyester resin, an urethane resin, an epoxy resin, a polyvinyl alcohol resin, a melamine resin, gelatin and a gelatin derivative, cellulose and a cellulose derivative, a polyimide resin, a phenol resin, an organic silicon compound, a urea resin, a diallylphthalate resin and a butyral resin. Further, in order to improve dispersion properties and preservation stability of the coating composition, surfactants, acids, bases or the like can be added.

As the surfactants that can be added, anionic, cationic or nonionic surfactants and the like can be widely used.

The acids that can be added include an inorganic acid such as hydrochloric acid, nitric acid, orthophosphoric acid, etc., an aliphatic oxy acid such as oxalic acid, lactic acid, tartaric acid, malic acid, citric acid, glycolic acid, hydroacrylic acid, α-oxy butyric acid, glyceric acid, tartoronic acid, etc., a phosphonic acid compound such as phenyl phosphonic acid, 1-hydroxyethylidene-1,1-diphosphonic acid, etc.

The bases that can be added include ammonia, an alkali metal hydroxide, an organic base for example an alkyl amine such as ethyl amine, diethyl amine, n-propyl amine, isopropyl amine, diisopropyl amine, dipropyl amine, n-butyl amine, isobutyl amine, diisobutyl amine, triethyl amine, benzyl amine, etc., aliphatic amines such as octyl amine, dodecyl amine, stearyl amine, etc., an alkanol amine such as monoethanol amine, triethanol amine, etc., a quaternary ammonium hydroxide such as guanidine hydroxide, tetramethylammonium hydroxide, tetraethylammonium hydroxide, etc., a carbonate such as ammonium carbonate and guanidine carbonate.

The acrylic resin includes the following ones that can be used singly or in a mixture of two or more. They can be also used in any state of monomer, oligomer or polymer. Examples of the acrylic resins are trifluoroethyl acrylate, trifluoromethyl acrylate, phenylglycidyl acrylate, hydroxyethyl (meth)acrylate, tetrahydrofuryl acrylate, acryloylmorpholine, N-vinyl pyrrolidone, N-vinyl-ε-caprolactam, neopentyl glycol (meth)acrylate, 1,6-hexanedioldi(meth)acrylate, trimethylol propane(meth)acrylate, ditrimethylol propanetetra(meth)acrylate, pentaerythritol tetra(meth)acrylate, pentaerythritol tri(meth)acrylate, pentaerythritol (meth)acrylate, ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, hydroxypivalic acid neopentyl glycol di(meth)acrylate, bisphenol A di(meth)acrylate, 2-ethyl, 2-butyl-propanediol di(meth)acrylate, 1,9-nonanediol di(meth)acrylate, hexyl 2,2-bis[4-(acryloxydiethoxy)phenyl]propane, 2,2-bis[4-(methacryloxydiethoxy)phenyl]propane, 3-phenoxy-2-propanoylacrylate, 1,6-bis(3-acryloxy-2-hydroxypropyl)-hexyl ether, trimethylol propane tri(meth)acrylate, glycerin tri(meth)acrylate, tris(2-hydroxyethyl) isocyanuric acid ester (meth)acrylate, pentaerythritol penta(meth)acrylate, dipentaerythritol hexa(meth)acrylate, 2-hydroxypropyl(meth)acrylate, isobutyl(meth)acrylate, t-butyl(meth)acrylate, 2-ethylhexyl(meth)acrylate, stearyl acrylate, 2-ethylhexylcarbitol acrylate, ω-carboxypolycaprolactone monoacrylate, acryloyloxy ethylic acid, acrylic acid dimer, lauryl(meth)acrylate, 2-methoxyethyl acrylate, butoxyethyl acrylate, ethoxyethoxy ethyl acrylate, methoxy triethylene glycol acrylate, methoxy polyethylene glycol acrylate, stearyl (meth)acrylate, cyclohexyl (meth)acrylate, tetrahydrofurfuryl (meth)acrylate, N-vinyl-2-pyrrolidone, isobonyl (meth)acrylate, dicyclopentenyl acrylate, benzyl acrylate, phenyl glycidyl ether epoxy acrylate, phenoxyethyl (meth)acrylate, phenoxy (poly)ethylene glycol acrylate, nonylphenol ethoxylated acrylate, acryloyloxyethyl phthalic acid, tribromophenyl acrylate, tribromophenol ethoxylated (meth)acrylate, methylmethacrylate, tribromophenyl methacrylate, methacryloyl oxyethylic acid, methacryloyloxyethyl maleic acid, methacryloyloxyethylhexahydrophthalic acid, methacryloyloxyethyl phthalic acid, polyethylene glycol (meth)acrylate, polypropylene glycol (meth)acrylate, β-carboxyethylacrylate, N-methylolacrylamide, N-methoxymethylacrylamide, N-ethoxymethylacrylamide, N-n-butoxymethylacrylamide, t-butylacrylamide sulfonic acid, vinyl stearate, N-methylacrylamide, N-dimethylacrylamide, N-dimethylaminoethyl(meth)acrylate, N-dimethylaminopropylacrylaamide, glycidylmethacrylate, n-butylmethacrylate, ethylmethacrylate, allyl methacrylate, cetyl methacrylate, pentadecyl methacrylate, methoxypolyethylene glycol (meth)acrylate, diethylaminoethyl(meth)acrylate, methacryloyloxyethyl succunate, hexanediol diacrylate, neopentyl glycol diacrylate, triethylene glycol diacrylate, polyethylene glycol diacrylate, polypropylene glycol diacrylate, hydroxypivalic acid ester neopentyl, pentaerythritol diacrylate monostearate, glycol diacrylate, 2-hydroxyethyl methacryloyl phosphate, bisphenol A ethylene glycol adduct acrylate, bisphenol F ethylene glycol adduct acrylate, tricyclodecane methanol diacrylate, trishydroxy ethylisocyanurate diacrylate, 2-hydroxy-1-acryloxy-3-methacryloxy propane, trimethylol propane triacrylate, trimethylol propane ethylene glycol adduct triacrylate, trimethylol propane propylene glycol adduct triacrylate, pentaerythritol triacrylate, trisacryloyloxy ethylphosphate, trishydroxyethylisocyanurate triacrylate, modified ε-caprolactone triacrylate, trimethylol propane ethoxy triacrylate, glycerin propylene glycol adduct triacrylate, pentaerythritol tetraacrylate, pentaerythritol ethylene glycol adduct tetraacrylate, di-trimethylol propane tetraacrylate, dipentaerythritol hexa(penta)acrylate, dipentaerythritol monohydroxypentaacrylate and epoxide acrylate.

The polyester resin is a linear polyester in which a dicarboxylic acid component and a glycol component are constituents. The dicarboxylic acid component and glycol component include the following ones that can be used singly or in a mixture of two or more. The dicarboxylic acid component: terephthalic acid, isophthalic acid, phthalic acid, 2,6-naphthalene dicarboxylic acid, 4,4-diphenyldicarboxylic acid, 1,4-cyclohexane dicarboxylic acid, adipic acid, sebacic acid, phenylindane dicarboxylic acid and dimer acid, etc. The glycol component: ethylene glycol, 1,4-butane diol, neopentyl glycol, diethylene glycol, dipropylene glycol, 1,6-hexane diol, 1,4-cyclohexane dimethanol, xylylene glycol, dimethylol propionic acid, glycerin, trimethylol propane, poly(ethyleneoxy) glycol, poly(tetramethyleneoxy)glycol, alkyleneoxide adduct of bisphenol A and alkyleneoxide adduct of hydrated bisphenol A.

The urethane resin that can be used is generally a compound produced by polyaddition of polyisocyanate and an active hydrogen-containing compound. The polyisocyanate and active hydrogen-containing compound include the following ones that can be used singly or in a mixture of two or more. The polyisocyanate: ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate (2,6-diisocyanatomethylcaproate), bis(2-isocyanatoethyl)fumarate, bis(2-isocyanatoethyl)carbonate, 2-isocyanatoethyl-2,6-diisocyanatohexanoate, isophorone diisocyanate (IPDI), dicyclohexylmethane-4,4'-diisocyanate (hydrated MDI), cyclohexylene diisocyanate, methylcyclohexylylene diisocyanate, bis(2-isocyanatoethyl)-4-cyclohexene-1,2-dicarboxylate, 2,5- and/or 2,6-norbornane diisocyanate, m- and/or p-xylylene diisocyanate, α,α,α',α'-tetramethylxylylene diisocyanate, and the like, and as a modified compound of polyisocyanate, a modified compound of polyisocyanate such as modified MDI (urethane modified MDI, carbodiimide modified MDI, trihydrocarbyl phosphate modified MDI), urethane modified TDI, biuret modified HDI, isocyanurate modified HDI, isocyanurate modified IPDI, and the like, and a mixture of two or more of the above-mentioned compounds. The active hydrogen-containing compound: divalent alcohol (ethylene glycol, diethylene glycol, 1,3-propane diol, 1,4-butane diol, 1,5-pentane diol, 1,6-hexana diol, etc.), diol having branched chain (propylene glycol, neopentyl glycol, 3-methyl-1,5-pentane diol, 2,2-diethyl-1,3-propane diol, 1,2-, 1,3- or 2,3-butane diol, etc.), diol having cyclic group (1,4-bis(hydroxymethyl)cyclohexane, m- or p-xylylene glycol, etc.), divalent phenol (bisphenol A, etc.), polyvalent alcohol (glycerin, trimethylol propane, pentaerythritol, sorbitol, etc.), saccharides and derivatives thereof (sucrose, methylglucoside, etc.), aliphatic diamine (ethylene diamine, hexamethylene diamine, etc.), alicyclic diamine (4,4'-diamino-3,3'-dimethyldicylcohexylmethane, 4,4'-diamino-3,3'-dimethyldicyclohexyl, diaminocyclohexane, isophorone diamine, etc.), aromatic diamine (diethyltoluene diamine, etc.), aromatic aliphatic diamine (xylylene diamine, α,α,α',α'-tetramethyl xylylene diamine, etc.), heterocyclic diamine (piperidine, etc.), multi-functional amine (diethylene triamine, triethylene tetramine, etc.), high molecular weight polyol (polyester polyol, polyether polyol, etc.), aliphatic polycarbon (succinic acid, glutaric acid, maleic acid, fumaric acid, adipic acid, azelaic acid, sebacic acid, hexahydrophthalic acid, etc.), aromatic polycarboxylic acid (phthalic acid, isophthalic acid, terephthalic acid, tetrabromophthalic acid, tetrachlorophthalic acid, trimellitic acid, pyromellitic acid, etc.), maleic anhydride, phthalic anhydride, dimethyl terephthalate, lactone monomer (γ-butyrolactone, ε-caprolactone, γ-valerolactone, etc.) and compounds having the structure in which alkylene oxide is added to a compound having two or more active hydrogen atoms.

The epoxy resin that can be used includes several liquid epoxy resins and derivatives thereof such as bisphenol A type, bisphenol F type, hydrated bisphenol A type, bisphenol AF type, phenol novolak type, or the like, liquid epoxy resins and derivatives thereof derived from polyvalent alcohol and epichlorohydrin, several glycidyl type liquid epoxy resins and derivatives thereof such as glycidylamine type, hydantoin type, aminophenol type, aniline type, toluidine type, or the like.

The polyvinyl alcohol resin that can be used includes a compound prepared by saponifying polyvinyl ester polymers prepared by radical polymerization of vinyl ester monomers such as vinyl acetate or the like. The polyvinyl ester polymers include for example the following ones that can be used singly or in a mixture of two or more. The polyvinyl ester polymers: polymers of vinyl esters such as vinyl formate, vinyl acetate, vinyl propionate, vinyl valerinate, vinyl laurate, vinyl stearate, vinyl benzoate, vinyl pivalate and vinyl barsatate or the like. The polyvinyl ester polymers may be copolymers prepared by copolymerizing the above-mentioned vinyl ester monomers on copolymerizable comonomers. The comonomers include olefins such as ethylene, propylene, 1-butene, isobutene or the like, acrylic acid and salts thereof, and acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate, or the like, methacrylic acid and salts thereof, and methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate, or the like, acrylamide derivatives such as acrylamide, hydroxy acrylamide, N-methyl acrylamide, N-ethyl acrylamide, N,N-dimethyl acrylamide, diacetone acrylamide, acrylamide propane sulfonic acid and salts thereof, acrylamide propyldimethyl amine and salts thereof or quaternary salts thereof, N-methylol acrylamide and derivatives thereof or the like, methacrylamide derivatives such as methacrylamide, N-methyl methacrylamide, N-ethyl methacrylamide, methacrylamide propane sulfonic acid and salts thereof, methacrylamide propyldimethyl amine and salts thereof or quaternary salts thereof, N-methylol methacrylamide and derivatives thereof or the like, vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether or the like, nitriles such as acrylonitrile, methacrylonitrile or the like, vinyl halide such as vinyl chloride, vinylidene chloride, vinyl fluoride, vinylidene fluoride or the like, allyl compounds such as allyl acetate, allyl chloride or the like, maleic acid and salts thereof, or esters thereof, vinyl silyl compounds such as vinyl trimethoxy silane or the like, isopropenyl acetate, and the like.

The melamine resin that can be used includes methylated melamine resin, butyrated melamine resin and methyl butyl mixed type melamine resin and the like.

The gelatin and gelatin derivative that can be used includes phthalated gelatin, succinated gelatin, trimellitic gelatin, pyromellitic gelatin, esterified gelatin, amidated gelatin and formylated gelatin and the like.

The cellulose and cellulose derivative that can be used includes diacetyl cellulose, triacetyl cellulose, hydroxypropyl cellulose, triacetyl cellulose, diacetyl cellulose, acetyl cellulose, cellulose acetate propionate, cellulose acetate butylate, cellulose acetate phthalate, cellulose acetate trimellitate and cellulose nitrate, etc.

The organic silicon compound includes for example silicon compounds containing the following component C and/or component D.

Component C: the organic silicon compounds of formula (I) or the hydrolyzed products thereof:

wherein $R^1$ and $R^3$ are independently an organic group selected from the group consisting of alkyl groups, alkenyl groups, aryl groups, acyl groups, halogen atoms, glycidoxy groups, epoxy groups, amino groups, phenyl groups, mercapto groups, methacryloxy groups and cyano groups,
$R^2$ is an organic group selected from the group consisting of alkyl groups having 1 to 8 carbon atoms, alkoxy groups, acyl groups and phenyl groups, and
a and b are an integer of 0 or 1; and
Component D: the organic silicon compounds of formula (II) or the hydrolyzed products thereof:

wherein $R^4$ is an organic group having 1 to 5 carbon atoms,
X is an alkyl group having 1 to 4 carbon atoms or an acyl group having 1 to 4 carbon atoms,
Y is an organic group having 2 to 20 carbon atoms, and
a is an integer of 0 or 1.

Component C is represented by formula (I), and concrete examples of the organic silicon compounds and the hydrolyzed products thereof include methyl silicate, ethyl silicate, n-propyl silicate, iso-propyl silicate, n-butyl silicate, tetraacetoxy silane, methyl trimethoxy silane, methyl tripropoxy silane, methyl triacetoxy silane, methyl tributoxy silane, methyl tripropoxy silane, methyl triamiroxy silane, methyl triphenoxy silane, methyl tribenzyloxy silane, methyl triphenethyloxy silane, glycidoxy methyl trimethoxy silane, glycidoxy methyl trimethoxy silane, α-glycidoxy ethyl trimethoxy silane, α-glycidoxy triethoxy silane, β-glycidoxy trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl triphenoxy silane, α-glycidoxy butyl trimethoxy silane, α-glycidoxy butyl triethoxy silane, β-glycidoxy butyl triethoxy silane, γ-glycidoxy butyl trimethoxy silane, γ-glycidoxy butyl triethoxy silane, δ-glycidoxy butyl trimethoxy silane, δ-glycidoxy butyl triethoxy silane, (3,4-epoxycyclohexyl) methyl trimethoxy silane, (3,4-epoxycyclohexyl) methyl triethoxy silane, β-(3,4-epoxycyclohexyl)ethyl trimethoxy silane, β-(3,4-epoxycyclohexyl)ethyl triethoxy silane, β-(3,4-epoxycyclohexyl)ethyl tripropoxy silane, β-(3,4-epoxycyclohexyl)ethyl tributoxy silane, β-(3,4-epoxycyclohexyl)ethyl triphenoxy silane, γ-(3,4-epoxycyclohexyl) propyl trimethoxy silane, γ-(3,4-epoxycyclohexyl) propyl triethoxy silane, δ-(3,4-epoxycyclohexyl) butyl trimethoxy silane, δ-(3,4-epoxycyclohexyl) butyl triethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl ethyl dimethoxy silane, α-glycidoxy propyl methyl dimethoxy silane, α-glycidoxy propyl methyl diethoxy silane, β-glycidoxy propyl methyl dimethoxy silane, β-glycidoxy propyl ethyl dimethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane, γ-glycidoxy propyl methyl diphenoxy silane, γ-glycidoxy propyl ethyl diethoxy silane, γ-glycidoxy propyl ethyl diethoxy silane, γ-glycidoxy propyl vinyl methoxy silane, γ-glycidoxy propyl vinyl ethoxy silane, γ-glycidoxy propyl vinyl phenyl methoxy silane, γ-glycidoxy propyl vinyl phenyl ethoxy silane, ethyl trimethoxy silane, ethyl triethoxy silane, vinyl trimethoxy silane, vinyl triacetoxy silane, vinyl trimethoxy ethoxy silane, phenyl trimethoxy silane, phenyl triethoxy silane, phenyl triacetoxy silane, γ-chloro propyl trimethoxy silane, γ-chloro propyl triethoxy silane, γ-chloro propyl triactoxy silane, 3,3,3-trifluoro propyl trimethoxy silane, γ-methacryloxy propyl trimethoxy silane, γ-mercapto propyl triethoxy silane, γ-mercapto propyl triethoxy silane, β-cyano ethyl triethoxy silane, chloro methyl trimethoxy silane, chloro methyl triethoxy silane, N-(β-aminoethyl) γ-aminopropyl trimethoxy silane, N-(β-aminoethyl) γ-aminopropyl methyl dimethoxy silane, γ-aminopropyl methyl trimethoxy silane, N-(β-aminoethyl) γ-aminopropyl triethoxy silane, N-(β-aminoethyl) γ-aminopropyl methyl diethoxy silane, dimethyl dimethoxy silane, phenyl methyl dimethoxy silane, dimethyl diethoxy silane, phenyl methyl diethoxy silane, γ-chloro propyl methyl dimethoxy silane, γ-chloro propyl methyl diethoxy silane, dimethyl diacetoxy silane, γ-methacryloxy propyl methyl dimethoxy silane, γ-methacryloxy propyl methyl diethoxy silane, γ-mercapto propyl methyl dimethoxy silane, γ-mercapto methyl diethoxy silane, methyl vinyl dimethoxy silane, methyl vinyl diethoxy silane, etc., and the hydrolyzed products thereof.

Component D is represented by formula (II). The concrete examples of the organic silicon compounds and the hydrolyzed products thereof include methylene bismethyl dimethoxy silane, ethylene bisethyl dimethoxy silane, propylene bisethyl diethoxy silane, butylene bismethyl diethoxy silane, etc., and the hydrolyzed products thereof.

As to the organic silicon compounds of Components C and D, only Component C or D may be used alone, or they may be used in a mixture of Components C and D. In addition, it is able to use Components C in a mixture of two or more, or Component D in a mixture of two or more.

Hydrolysis of the organic silicon compounds of Components C and/or Component D is carried out by adding an acidic aqueous solution such as an aqueous solution of hydrochloric acid, sulfuric acid or acetic acid in the organic silicon compounds of Components C and/or Component D and then stirring.

As the organic silicon compound, in addition to the above-mentioned silicon compounds, modified silicone varnish such as silicone varnish, silicone alkyd varnish, silicone epoxy varnish, silicone acrylic varnish, and silicone polyester varnish, etc. and the like can be used. These compounds can be used singly or in a mixture of two or more.

The diallyl phthalate resin that can be used includes diallyl phthalate, diallyl isophthalate and diallyl terephthalate, etc.

The butyral resin includes polyvinyl butyral.

In the coating composition comprising the conductive tin oxide sol of the present invention and a binder, the mixed ratio of the conductive tin oxide colloidal particles (A) contained in the conductive tin oxide sol and the solid content of the binder is 90:10 to 10:90, or 70:30 to 30:70, or 60:40 to 40:60.

Further, the materials having transparent conductive or transparent antistatic coating film can be produced by applying the above-mentioned coating composition on a substrate. The material that can be used are several materials such as plastic, rubber, glass, metal, ceramics and paper, etc.

The method for applying the coating composition may be any known methods, and includes for example bar coating method, reverse method, gravure printing method, macrogravure printing method, dipping method, spin coating method, spray method, and the like The coating composition can form a cured coating by applying it on a substrate and then subjecting to curing process. The curing process can be carried out by drying with hot air or activated energy radiation. When the drying with hot air is used, it can be carried out in a hot air at 70 to 200° C. or 90 to 150° C. When the activated energy radiation is used, ultraviolet radiation, infrared radiation, far infrared rays, electron rays and the like can be used.

The thickness of the coating film formed from the coating composition comprising the conductive tin oxide sol of the present invention and a binder is not specifically limited and is about 0.1 to 10 micrometer, and the coating film is generally formed in a thickness of about 1 to 5 micrometer.

The surface resistance of the coating film formed from the coating composition containing the conductive tin oxide sol of the present invention and a binder can be measured with a surface resistance meter (for example, Hirestor UP (manufactured by Mitsubishi Chemical Corporation), or Lowrestor IP (manufactured by Mitsubishi Chemical Corporation)). The coating film has a surface resistance ranging from $10^5$ to $10^{10}\Omega/\square$, and shows an extremely good antistatic property.

The refractive index of the coating film varies depending on the mixed ratio of the conductive tin oxide sol and the binder, and the kind of the binder, and rages from 1.55 to 1.90.

The coating film with a high refractive index prepared by applying the coating composition comprising the conductive tin oxide sol of the present invention and a binder can have anti-reflective properties by further providing anti-reflective coating.

The anti-reflective coating can be obtained by providing on a coating film with a high refractive index prepared according to the present invention, a coating film with a lower refractive index than the coating film with a high refractive index. The difference in refractive index between the coating film with a low refractive index and the coating film with a high refractive index is preferably 0.05 or more. When the difference in refractive index is less than 0.05, the synergetic effect by the anti-reflective coating cannot be acquired, and on the contrary the anti-reflective effect is often lowered. Therefore, it is preferable to set the difference in refractive index between the coating film with a low refractive index and the coating film with a high refractive index to 0.1 to 0.5, more preferably 0.15 to 0.5. The thickness of the coating film with a low refractive index is not specifically limited, and for example preferably 50 to 300 nm. It is preferable that the thickness of the coating film with a low refractive index is 50 to 300 nm. When the thickness of the coating film with a low refractive index is less than 50 nm, adhesiveness to the coating film with a high refractive index being a base film is often lowered. On the other hand, when the thickness is more than 300 nm, light interference occurs and anti-reflective effect is often lowered. When plural coating films with a low refractive index are provided in order to acquire a higher antireflective properties, the total thickness thereof is preferably 50 to 300 nm.

The materials constituting the coating film with a low refractive index is not specifically limited, and include for example the organic silicon compounds of formula (I) or (II) and the hydrolyzed products thereof, fluorine based resins such as fluoro-olefin based polymers and fluorine-containing acrylic polymers, and the like, and low refractive index coating compositions prepared by mixing magnesium fluoride, lithium fluoride, sodium magnesium fluoride or fine particles having voids with an organic or inorganic binder, and the like. Inorganic compounds such as magnesium fluoride or silica, or the like can be subjected to a process such as vacuum evaporation or sputtering to form a coating film with a low refractive index.

Further, as the anti-reflective coating, a multi-layered anti-reflective coating prepared by laminating a high refractive index layer and a low refractive index layer alternately can be provided and afford anti-reflective properties. The high refractive index layer is a layer of at least one oxide selected from the group consisting of titanium, tantalum, zirconium, niobium and yttrium, and the low refractive index layer is at least one layer selected from the group consisting of silica, alumina, magnesium fluoride, lithium fluoride and sodium magnesium fluoride. These high refractive index layers and low refractive index layers can be formed by vacuum evaporation or sputtering, dry plating method such as ion plating method or the like.

EXAMPLES

Referential Example 1

Preparation of Starting Material Alkaline Tin Oxide Aqueous Sol

After 37.5 kg of oxalic acid $((COOH)_2 \cdot 2H_2O)$ was dissolved in 383 kg of pure water, the resulting solution was placed in a 500 L-vessel and heated to 70° C. with stirring, and 150 kg of 35 mass % hydrogen peroxide water and 75 kg of metal tin (manufactured by Yamaishi Metal Co., Ltd., trade name: AT-SNNO200N) were added. The addition of the hydrogen peroxide water and metal tin was carried out alternately. Firstly, 10 kg of 35 mass % hydrogen peroxide water was added and then 5 kg of metal tin was added. After the completion of the reaction (5 to 10 minutes), the above-mentioned procedure was repeated. After the completion of the addition of the whole amount, 10 kg of 35 mass % hydrogen peroxide water was further added. For the addition, 2.5 hours was required. After the completion of the addition, the reaction mixture was further heated at 95° C. for 1 hour, and the reaction was ceased. The molar ratio of hydrogen peroxide water and metal tin was 2.61 in $H_2O_2/Sn$. The resulting tin oxide aqueous sol showed a very high transparency. The tin oxide aqueous sol had a yield of 630 kg, a specific gravity of 1.154, pH 1.51 and $SnO_2$ concentration of 14.7 mass %. The observation of the resulting sol with electron microscope showed that the sol contained colloidal particles having 10 to 15 nm spherical shape and good dispersion properties. This sol showed a tendency of a slight increase in viscosity on standing but gelation was not recognized after leaving at room temperature for 6 months, and thus it was stable.

In 629 kg of the resulting sol, 231 kg of 35 mass % hydrogen peroxide water and 52 kg of pure water were added and diluted so as to have $SnO_2$ concentration of 10 mass % and $H_2O_2/(COOH)_2$ molar ratio that is a ratio of hydrogen peroxide to oxalic acid placed in the vessel of 8.0, and heated at 95° C. and aged for 5 hours. This procedure led to decomposition into carbonic acid gas and water by reaction of contained oxalic acid with hydrogen peroxide. The resulting tin oxide slurry was cooled to about 40° C., and then 2.7 kg of isopropyl amine was added and peptized. Thereafter, the mixture was passed and circulated through a catalyst tower in which about 15 L of platinum based catalyst (N-220 (manufactured by Sud-Chemie Catalysts Japan, Inc., trade name)) was filled, and thereby excess hydrogen peroxide was decomposed. The passing rate was about 30 L/min. and circulation was carried out for 5 hours. Further, the mixture was passed and circulated through a column in which anion exchange resin (Amberlite IRA-410: manufactured by Organo Corporation, trade name) to obtain 1545 kg of alkaline tin oxide aqueous sol. The resulting alkaline tin oxide aqueous sol had pH 11.03 and an electrical conductivity of 305 μS/cm.

Example 1

In 2200 g of the alkaline tin oxide aqueous sol (prepared so as to have $SnO_2$ concentration of 6.0 mass %) obtained in Referential Example 1, 29.5 g of an aqueous solution prepared by mixing 26 g of 10% orthophosphoric acid and 3.5 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 9.66 and an electrical conductivity of 1600 μS/cm. After the phosphoric acid-mixed alkaline tin oxide aqueous sol was placed in a 3 L-autoclave, the temperature was increased to 150° C. and maintained at the temperature for 8 hours. The resulting phosphorus-doped alkaline conductive tin oxide aqueous sol had pH 10.51 and an electrical conductivity of 1450 μS/cm. The residual diisopropyl amine and phosphate ion were removed by passing the phosphorus-doped alkaline conductive tin oxide aqueous sol through an anion exchange resin and a cation exchange resin in that order to obtain an acidic conductive tin oxide aqueous sol. The resulting acidic conductive tin oxide aqueous sol had pH 3.54 and an electrical conductivity of 80 μS/cm. After adding 0.66 g of diisobutylamine in 2458 g of the acidic conductive tin oxide aqueous sol ($SnO_2$ concentration: 5.18 mass %) with stirring, it was stirred for 1 hour, and concentrated with a rotary evaporator under a reduced pressure to 432 g, thereby a conductive tin oxide aqueous sol was obtained. The conductive tin oxide aqueous sol had a specific gravity of 1.35, pH 5.14, an electrical conductivity of 460

μS/cm, $SnO_2$ concentration of 30.7 mass %, a particle diameter with transmission electron microscope observation of 2 to 25 nm, and an average particle diameter based on a dynamic light scattering method of 22 nm. The conductive tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 88.5%. The dried product prepared by drying the sol at 130° C. had a specific surface area based on the BET method of 140 $m^2/g$. Further, the X-ray diffraction of the dried product showed that it had a peak of Cussiterite, and the fluorescent X-ray analysis showed that it had a molar ratio of doped-phosphorus (P) to tin oxide ($SnO_2$) of 0.021. Water in 420 g of the resulting conductive tin oxide aqueous sol having $SnO_2$ concentration of 30.7 mass % was replaced with methanol with a rotary evaporator under a reduced pressure to obtain 412 g of a conductive tin oxide methanol sol. The methanol sol had $SnO_2$ concentration of 31.3 mass %, a specific gravity of 1.10, pH (1+1) 6.00, and an electrical conductivity of 59 μS/cm. The conductive tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 76.3%.

Example 2

In 100 g of the conductive tin oxide methanol sol obtained in Example 1, 6.3 g of a resin type pigment dispersant Disperbyk-106 (trade name, by manufactured by BYK Japan KK; component: polymer salt having acid group) was added, and subjected to a replacement with methyl ethyl ketone by use of a rotary evaporator under a reduced pressure to obtain 103 g of a conductive tin oxide methyl ethyl ketone sol. The methyl ethyl ketone sol had $SnO_2$ concentration of 30.3 mass %, and a specific gravity of 1.15. The conductive tin oxide methyl ethyl ketone sol was adjusted to 10 mass %, and the measurement with a spectroscopic colorimeter TC-1800MK-II (manufactured by Tokyopenshoku Co., Ltd.) showed that it had a transmittance at a wavelength of 600 nm of 78.7%.

Example 3

In 100 g of the conductive tin oxide methanol sol obtained in Example 1, 3.1 g of a resin type pigment dispersant Disperbyk-106 (trade name, by manufactured by BYK Japan KK; component: polymer salt having acid group) was added, and subjected to a replacement with methyl ethyl ketone by use of a rotary evaporator under a reduced pressure to obtain 103 g of a conductive tin oxide methyl ethyl ketone sol. The methyl ethyl ketone sol had $SnO_2$ concentration of 30.2 mass %, and a specific gravity of 1.11. The conductive tin oxide methyl ethyl ketone sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 42.9%.

Example 4

In 5 g of the conductive tin oxide methanol sol obtained in Example 1, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a conductive tin oxide. The resulting resin composition was in a good dispersion state. This composition was applied on upper surface of a PET film (125 μm) with a wire bar of No. 12 (27.4 μm), and then irradiated with UV light by use of a UV irradiation apparatus to obtain a PET film having conductive coating film. The film thickness of the conductive coating film was 1.1 μm.

The measurement of the resulting PET film having conductive coating film with a spectroscopic colorimeter TC-1800MK-II (manufactured by Tokyopenshoku Co., Ltd.) showed L=99.18, a=−0.12, b=0.79, and YI=2.5, and the haze measurement with a spectroscopic haze-meter TC-H3DPK-MK-II (manufactured by Tokyopenshoku Co., Ltd.) showed that total transmittance (Tt) was 99.5% and haze was 2.5. The surface resistance of the film measured by a surface resistance meter Hirestor UP (manufactured by Mitsubishi Chemical Corporation) was $4 \times 10^9 \Omega/\square$ at a temperature of 24° C. in a relative humidity of 33%.

It was recognized that the phosphorus-doped tin oxide sol of the present invention was improved in electrical conductivity by irradiation of UV light and visible light. In the above-mentioned Example 4, the surface resistance of the film on film curing immediately after UV light irradiation was $1 \times 10^7 \Omega/\square$, and reached an equilibrium state on standing, showed $4 \times 10^9 \Omega/\square$ 2 hours later. When this film was irradiated with UV light again, the surface resistance showed $1 \times 10^7 \Omega/\square$ that was the same as the value immediately after curing.

Example 5

Preparation of Coating Composition

In a glass vessel provided with a magnetic stirrer, 49.9 g of γ-glycidoxypropyl trimethoxy silane corresponding to the above-mentioned Component C was added, and 17.4 g of 0.01 N hydrochloric acid was added dropwise with stirring over 3 hours. After the completion of the addition dropwise, stirring was carried out for 0.5 hour to obtain a partially hydrolyzed product of γ-glycidoxypropyl trimethoxy silane. In 67.3 g of the hydrolyzed product, 200 g of the conductive tin oxide methanol sol obtained in Example 1 was added, and further 0.8 g of aluminum acetyl acetonate as a curing agent was added and fully stirred, and then filtered to prepare a coating composition.

(Preparation of Coating Composition)
(Formation of Cured Film)

The coating composition prepared above was applied on a glass substrate with 5 cm square by spin coating, and the coating film was cured by heating at 120° C. for 2 hours. The resulting conductive coating film with a high refractive index had a film thickness of 1.4 μm, and the refractive index was 1.66 and the reflection factor was 4.51%. The refractive index and reflection factor were measured with a lens reflection factor meter.

(Preparation of Anti-Reflective Coating)

On the resulting conductive coating film with a high refractive index, a partially hydrolyzed product of tetraethoxy silane as a low refractive index coating film for affording anti-reflective properties was applied by spin coating, and heated at 110° C. for 1 hour to make the applied coating cure. The resulting conductive coating film with a high refractive index having anti-reflective coating had a film thickness of 1.7 μm, and a reflection factor of 1.43%.

Example 6

In 2200 g of the alkaline tin oxide aqueous sol (prepared so as to have $SnO_2$ concentration of 6.0 mass %) obtained in Referential Example 1, 97.5 g of an aqueous solution prepared by mixing 85.9 g of 10% orthophosphoric acid and 11.6 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 7.38 and an electrical conductivity of 4020 μS/cm. After the phosphoric acid-mixed alkaline tin oxide aqueous sol was placed in a 3 L-autoclave, the temperature was increased to 150° C. and maintained at the temperature for 8 hours. The resulting phosphorus-doped alkaline conductive tin oxide aqueous sol had pH 8.8 and an electrical conductivity of 4450 μS/cm. The residual diisopropyl amine and phosphate ion were removed by passing the phosphorus-doped alkaline conductive tin oxide aqueous sol through an anion exchange resin and a cation exchange resin in that order to obtain an acidic conductive tin oxide aqueous sol. The resulting acidic conductive tin oxide aqueous sol had pH 3.74 and an electrical conductivity of 70 μS/cm. After adding 0.66 g of diisobutylamine in 2490 g of the acidic conductive tin oxide aqueous sol ($SnO_2$ concentration: 5.30 mass %) with stirring, it was stirred for 1 hour, and concentrated with a rotary evaporator under a reduced pressure to 428 g, thereby a conductive tin oxide aqueous sol having $SnO_2$ concentration of 30.8 mass % was obtained. The conductive tin oxide aqueous sol had a specific gravity of 1.35, pH 5.31, an electrical conductivity of 440 μS/cm, a particle diameter with transmission electron microscope observation of 3 to 23 nm, and an average particle diameter based on a dynamic light scattering method of 23 nm. The conductive tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 87.3%. Further, the fluorescent X-ray analysis showed that it had a molar ratio of doped-phosphorus (P) to tin oxide ($SnO_2$) of 0.081. Water in 405 g of the resulting conductive tin oxide aqueous sol having $SnO_2$ concentration of 30.8 mass % was replaced with methanol with a rotary evaporator under a reduced pressure to obtain 410 g of a conductive tin oxide methanol sol. The methanol sol had $SnO_2$ concentration of 30.5 mass %, a specific gravity of 1.1, pH (1+1) 6.55, and an electrical conductivity of 60 μS/cm. The conductive tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 78.2%.

Example 7

In 5 g of the conductive tin oxide methanol sol obtained in Example 6, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a conductive tin oxide. The resulting resin composition was in a good dispersion state. This composition was applied on upper surface of a PET film (125 μm) with a wire bar of No. 12 (27.4 μm), and then irradiated with UV light by use of a UV irradiation apparatus to obtain a PET film having conductive coating film. The film thickness of the conductive coating film was 1.1 μm. The measurement of the resulting PET film having conductive coating film with a spectroscopic colorimeter TC-1800MK-II (manufactured by Tokyopenshoku Co., Ltd.) showed L=99.6, a=−0.13, and b=0.78, and the haze measurement with a spectroscopic haze-meter TC-H3DPK-MK-II (manufactured by Tokyopenshoku Co., Ltd.) showed that total transmittance (Tt) was 99.6% and haze was 1.6. The surface resistance of the film measured by a surface resistance meter Hirestor UP (manufactured by Mitsubishi Chemical Corporation) was $2 \times 10^9 \Omega/\square$ at a temperature of 24° C. in a relative humidity of 33%.

Example 8

In 2200 g of the alkaline tin oxide aqueous sol (prepared so as to have $SnO_2$ concentration of 6.0 mass %) obtained in Referential Example 1, 29.5 g of an aqueous solution prepared by mixing 26 g of 10% orthophosphoric acid and 3.5 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 9.66 and an electrical conductivity of 1600 μS/cm. After the phosphoric acid-mixed alkaline tin oxide aqueous sol was placed in a 3 L-autoclave, the temperature was increased to 200° C. and maintained at the temperature for 8 hours. The resulting phosphorus-doped alkaline conductive tin oxide aqueous sol had pH 10.2 and an electrical conductivity of 1340 μS/cm. The residual diisopropyl amine and phosphate ion were removed by passing the phosphorus-doped alkaline conductive tin oxide aqueous sol through an anion exchange resin and a cation exchange resin in that order to obtain an acidic conductive tin oxide aqueous sol. The resulting acidic conductive tin oxide aqueous sol had pH 3.55 and an electrical conductivity of 80 μS/cm. After adding 0.66 g of diisobutylamine in 2550 g of the acidic conductive tin oxide aqueous sol ($SnO_2$ concentration: 5.18 mass %) with stirring, it was stirred for 1 hour, and concentrated with a rotary evaporator under a reduced pressure to 432 g, thereby a conductive tin oxide aqueous sol having $SnO_2$ concentration of 30.6 mass % was obtained. The conductive tin oxide aqueous sol had a specific gravity of 1.35, pH 5.11, an electrical conductivity of 444 μS/cm, a particle diameter with transmission electron microscope observation of 5 to 25 nm, and an average particle diameter based on a dynamic light scattering method of 66 nm. The conductive tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 62.5%. Further, the fluorescent X-ray analysis showed that it had a molar ratio of doped-phosphorus (P) to tin oxide ($SnO_2$) of 0.020. Water in 405 g of the resulting conductive tin oxide aqueous sol having $SnO_2$ concentration of 30.6 mass % was replaced with methanol with a rotary evaporator under a reduced pressure to obtain 411 g of a conductive tin oxide methanol sol. The methanol sol had $SnO_2$ concentration of 31.0 mass %, a specific gravity of 1.12, pH (1+1) 6.7, and an electrical conductivity of 50 μS/cm. The conductive tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 56.6%.

Example 9

In 5 g of the conductive tin oxide methanol sol obtained in Example 8, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a conductive tin oxide. The resulting resin composition was in a good dispersion state. This composition was applied on upper surface of a PET film (125 µm) with a wire bar of No. 12 (27.4 µm), and then irradiated with UV light by use of a UV irradiation apparatus to obtain a PET film having conductive coating film. The film thickness of the conductive coating film was 1.1 µm. The measurement of the resulting PET film having conductive coating film with a spectroscopic colorimeter TC-1800MK-II (manufactured by Tokyopenshoku Co., Ltd.) showed L=99.4, a=−0.13, and b=0.81, and the haze measurement with a spectroscopic haze-meter TC-H3DPK-MK-II (manufactured by Tokyopenshoku Co., Ltd.) showed that total transmittance (Tt) was 99.6% and haze was 1.6. The surface resistance of the film measured by a surface resistance meter Hirestor UP (manufactured by Mitsubishi Chemical Corporation) was $3 \times 10^9 \Omega/\square$ at a temperature of 24° C. in a relative humidity of 33%. It was confirmed that the phosphorus-doped tin oxide sol of the present invention was improved in conductivity by irradiation of UV light and visible light.
In the above-mentioned Example 9, the surface resistance of the film immediately after UV light was irradiated when the film was cured (measured by a low resistance meter Lowrestor IP "MCP-T250" (manufactured by Mitsubishi Chemical Corporation)) was $3 \times 10^5 \Omega/\square$. However, equilibrium was reached on standing, two hours later, the surface resistance (measured by a surface resistance meter Hirestor UP (manufactured by Mitsubishi Chemical Corporation)) showed $3 \times 10^9 \Omega/\square$. When this film was irradiated with UV light, the surface resistance (measured by a low resistance meter Lowrestor IP "MCP-T250" (manufactured by Mitsubishi Chemical Corporation)) showed $3 \times 10^5 \Omega/\square$ that was the same as the value immediately after curing.

Example 10

In 2200 g of the alkaline tin oxide aqueous sol (prepared so as to have $SnO_2$ concentration of 6.0 mass %) obtained in Referential Example 1, 29.5 g of an aqueous solution prepared by mixing 26 g of 10% orthophosphoric acid and 3.5 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 9.66 and an electrical conductivity of 1600 µS/cm. After the phosphoric acid-mixed alkaline tin oxide aqueous sol was placed in a 3 L-autoclave, the temperature was increased to 240° C. and maintained at the temperature for 5 hours. The resulting phosphorus-doped alkaline conductive tin oxide aqueous sol had pH 10.3 and an electrical conductivity of 1300 µS/cm. The residual diisopropyl amine and phosphate ion were removed by passing the phosphorus-doped alkaline conductive tin oxide aqueous sol through an anion exchange resin and a cation exchange resin in that order to obtain an acidic conductive tin oxide aqueous sol. The resulting acidic conductive tin oxide aqueous sol had pH 3.45 and an electrical conductivity of 90 µS/cm. After adding 0.66 g of diisobutylamine in 2660 g of the acidic conductive tin oxide aqueous sol ($SnO_2$ concentration: 4.96 mass %) with stirring, it was stirred for 1 hour, and concentrated with a rotary evaporator under a reduced pressure to 426 g, thereby a conductive tin oxide aqueous sol having $SnO_2$ concentration of 31.0 mass % was obtained. The conductive tin oxide aqueous sol had a specific gravity of 1.34, pH 6.66, an electrical conductivity of 445 µS/cm, a particle diameter with transmission electron microscope observation of 6 to 30 nm, and an average particle diameter based on a dynamic light scattering method of 82 nm. The conductive tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 55.5%. Further, the fluorescent X-ray analysis showed that it had a molar ratio of doped-phosphorus (P) to tin oxide ($SnO_2$) of 0.019. Water in 406 g of the resulting conductive tin oxide aqueous sol having $SnO_2$ concentration of 31.0 mass % was replaced with methanol with a rotary evaporator under a reduced pressure to obtain 405 g of a conductive tin oxide methanol sol. The conductive tin oxide methanol sol had $SnO_2$ concentration of 31.2 mass %, a specific gravity of 1.12, pH (1+1) 6.7, and an electrical conductivity of 51 µS/cm. The conductive tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 54.5%.

Example 11

In 5 g of the conductive tin oxide methanol sol obtained in Example 10, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a conductive tin oxide. The resulting resin composition was in a good dispersion state. This composition was applied on upper surface of a PET film (125 µm) with a wire bar of No. 12 (27.4 µm), and then irradiated with UV light by use of a UV irradiation apparatus to obtain a PET film having conductive coating film. The film thickness of the conductive coating film was 1.1 µm. The measurement of the resulting PET film having conductive coating film with a spectroscopic colorimeter TC-1800MK-II (manufactured by Tokyopenshoku Co., Ltd.) showed L=99.3, a=−0.13, and b=0.80, and the haze measurement with a spectroscopic haze-meter TC-H3DPK-MK-II (manufactured by Tokyopenshoku Co., Ltd.) showed that total transmittance (Tt) was 99.6% and haze was 1.6. The surface resistance of the film measured by a surface resistance meter Hirestor UP (manufactured by Mitsubishi Chemical Corporation) was $4 \times 10^9 \Omega/\square$ at a temperature of 24° C. in a relative humidity of 33%.

Comparative Example 1

After 2200 g of the alkaline tin oxide aqueous sol (prepared so as to have $SnO_2$ concentration of 6.0 mass %) obtained in Referential Example 1 was placed in a 3 L-autoclave, the temperature was increased to 150° C. and maintained at the temperature for 8 hours. The resulting alkaline tin oxide aqueous sol had pH 10.9 and an electrical conductivity of 351 µS/cm. When the alkaline tin oxide aqueous sol was passed through an anion exchange resin and a cation exchange resin in that order, the sol was gelled. Therefore, the alkaline tin oxide aqueous sol was not passed through any ion exchange resins, and concentrated with a rotary evaporator under a reduced pressure to 425 g to obtain an alkaline tin oxide aqueous sol having $SnO_2$ concentration of 30.9 mass %. The alkaline tin oxide aqueous sol had a specific gravity of 1.35, pH 10.5, an electrical conductivity of 600 µS/cm, a particle diameter with transmission electron microscope observation of 2 to 20 nm, and an average particle diameter based on a dynamic light scattering method of 17 nm. The alkaline tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 88.0%. Water in 400 g of the alkaline tin oxide aqueous sol having $SnO_2$ concentration of 30.9 mass % was replaced with methanol with a rotary evaporator under a reduced pressure to obtain 405 g of a tin oxide methanol sol. The tin oxide methanol sol had $SnO_2$ concentration of 30.8 mass %, a specific gravity of 1.11, pH (1+1) 10.0, and an electrical conductivity of 315 µS/cm. The conductive tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 78.1%.

Comparative Example 2

In 5 g of the tin oxide methanol sol obtained in Comparative Example 1, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a tin oxide. The resulting resin composition was in a good dispersion state. This composition was applied on upper surface of a PET film (125 µm) with a wire bar of No. 12 (27.4 µm), and then irradiated with UV light by use of a UV irradiation apparatus to obtain a PET film having coating film containing tin oxide. The film thickness of the conductive coating film was 1.1 µm. The measurement of the resulting PET film having coating film with a spectroscopic colorimeter TC-1800MK-II (manufactured by Tokyopenshoku Co., Ltd.) showed L=99.5, a=−0.13, and b=0.80, and the haze measurement with a spectroscopic haze-meter TC-H3DPK-MK-II (manufactured by Tokyopenshoku Co., Ltd.) showed that total transmittance (Tt) was 99.2% and haze was 1.5. The surface resistance of the film measured by a surface resistance meter Hirestor UP (manufactured by Mitsubishi Chemical Corporation) was $4 \times 10^{12} \Omega/\square$ at a temperature of 24° C. in a relative humidity of 33%.

Comparative Example 3

In 2200 g of the alkaline tin oxide aqueous sol (prepared so as to have $SnO_2$ concentration of 6.0 mass %) obtained in Referential Example 1, 29.5 g of an aqueous solution prepared by mixing 26 g of 10% orthophosphoric acid and 3.5 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 9.66 and an electrical conductivity of 1600 µS/cm. After the phosphoric acid-mixed alkaline tin oxide aqueous sol was placed in a 3 L-autoclave, the temperature was increased to 90° C. and maintained at the temperature for 8 hours. The resulting alkaline tin oxide aqueous sol had pH 9.88 and an electrical conductivity of 1280 µS/cm. When the alkaline tin oxide aqueous sol was passed through an anion exchange resin and a cation exchange resin in that order, the sol was gelled. Thus, the alkaline tin oxide aqueous sol was passed through an anion exchange resin, and then was not passed through a cation exchange resin to obtain a tin oxide aqueous sol. The resulting tin oxide aqueous sol had pH 9.44, and an electrical conductivity of 80 µS/cm. The fluorescent X-ray analysis showed that it had a molar ratio of doped-phosphorus (P) to tin oxide ($SnO_2$) of 0.004. The orthophosphoric acid added in the alkaline tin oxide aqueous sol being a starting material was not almost doped in the tin oxide sol particles, and removed by anion exchange. 2450 g ($SnO_2$ concentration: 5.39 mass %) of the tin oxide aqueous sol subjected to anion exchange was concentrated with a rotary evaporator under a reduced pressure to 425 g, and thereby a tin oxide aqueous sol having $SnO_2$ concentration of 31.0 mass % was obtained. The tin oxide aqueous sol had a specific gravity of 1.36, pH 10.4, an electrical conductivity of 715 µS/cm, a particle diameter with transmission electron microscope observation of 2 to 25 nm, and an average particle diameter based on a dynamic light scattering method of 20 nm. The tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 87.0%. Water in 420 g of the tin oxide aqueous sol having $SnO_2$ concentration of 31.0 mass % was replaced with methanol with a rotary evaporator under a reduced pressure to obtain 412 g of a tin oxide methanol sol. The tin oxide methanol sol had $SnO_2$ concentration of 31.1 mass %, a specific gravity of 1.12, pH (1+1) 10.4, and an electrical conductivity of 383 µS/cm. The tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 77.2%.

Comparative Example 4

In 5 g of the tin oxide methanol sol obtained in Comparative Example 3, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a tin oxide. The resulting resin composition was in a good dispersion state. This composition was applied on upper surface of a PET film (125 µm) with a wire bar of No. 12 (27.4 µm), and then irradiated with UV light by use of a UV irradiation apparatus to obtain a PET film having coating film containing tin oxide. The film thickness of the conductive coating film was 1.1 µm.
The measurement of the resulting PET film having coating film with a spectroscopic colorimeter TC-1800MK-II (manufactured by Tokyopenshoku Co., Ltd.) showed L=99.6, a=−0.13, and b=0.78, and the haze measurement with a spectroscopic haze-meter TC-H3DPK-MK-II (manufactured by Tokyopenshoku Co., Ltd.) showed that total transmittance (Tt) was 99.6% and haze was 1.5. The surface resistance of the film measured by a surface resistance meter Hirestor UP (manufactured by Mitsubishi Chemical Corporation) was $2 \times 10^{11} \Omega/\square$ at a temperature of 24° C. in a relative humidity of 33%.

Comparative Example 5

In 2200 g of the alkaline tin oxide aqueous sol (prepared so as to have $SnO_2$ concentration of 6.0 mass %) obtained in Referential Example 1, 6.1 g of an aqueous solution prepared by mixing 2.6 g of 10% orthophosphoric acid and 3.5 g of diisopropylamine was gradually added with stirring, after the completion of the addition, stirring was continued for 30 minutes to prepare a phosphoric acid-mixed alkaline tin oxide aqueous sol. The resulting phosphoric acid-mixed alkaline tin oxide aqueous sol had pH 10.4 and an electrical conductivity of 1000 μS/cm. After the phosphoric acid-mixed alkaline tin oxide aqueous sol was placed in a 3 L-autoclave, the temperature was increased to 150° C. and maintained at the temperature for 8 hours. The resulting alkaline tin oxide aqueous sol had pH 10.0 and an electrical conductivity of 880 μS/cm. When the alkaline tin oxide aqueous sol was passed through an anion exchange resin and a cation exchange resin in that order, the sol was gelled. Thus, 2000 g of the alkaline tin oxide aqueous sol was passed through an anion exchange resin, and then was not passed through a cation exchange resin to obtain a tin oxide aqueous sol. The resulting tin oxide aqueous sol was concentrated with a rotary evaporator under a reduced pressure to 388 g, and thereby an alkaline tin oxide aqueous sol having $SnO_2$ concentration of 30.8 mass % was obtained. The alkaline tin oxide aqueous sol had a specific gravity of 1.36, pH 10.4, an electrical conductivity of 660 μS/cm, a particle diameter with transmission electron microscope observation of 2 to 20 nm, and an average particle diameter based on a dynamic light scattering method of 20 nm. The fluorescent X-ray analysis showed that it had a molar ratio of doped-phosphorus (P) to tin oxide ($SnO_2$) of 0.002. The alkaline tin oxide aqueous sol was adjusted to $SnO_2$ concentration of 10 mass %, and subjected to a measurement with a spectroscopic colorimeter TC-1800MK-II (manufactured by Tokyopenshoku Co., Ltd.) in an optical path length of 10 mm. As a result of it, the transmittance at a wavelength of 600 nm was 86.8%. Water in 380 g of the tin oxide aqueous sol having $SnO_2$ concentration of 30.8 mass % was replaced with methanol with a rotary evaporator under a reduced pressure to obtain 381 g of a tin oxide methanol sol. The tin oxide methanol sol had a solid content of 30.8 mass %, a specific gravity of 1.11, pH (1+1) 10.3, and an electrical conductivity of 366 μS/cm. The tin oxide methanol sol was adjusted to $SnO_2$ concentration of 10 mass %, and the measurement with a spectroscopic colorimeter TC-1800MK-II (manufactured by Tokyopenshoku Co., Ltd.) showed that it had a transmittance at a wavelength of 600 nm of 77.9%.

Comparative Example 6

In 5 g of the tin oxide methanol sol obtained in Comparative Example 5, an UV curable resin composition in which 0.9 g of dipentaerythritol hexaacrylate (KAYARAD DPHA (manufactured by Nippon Kayaku Co., Ltd., trade name), 0.1 g of photoinitiator Irugacure 184 (manufactured by CIBA-GEIGY AG, trade name) and 2.1 g of n-butanol were mixed was formulated to obtain a resin composition containing a tin oxide. The resulting resin composition was in a good dispersion state. This composition was applied on upper surface of a PET film (125 μm) with a wire bar of No. 12 (27.4 μm), and then irradiated with UV light by use of a UV irradiation apparatus to obtain a PET film having coating film containing tin oxide. The film thickness of the conductive coating film was 1.1 μm.
The measurement of the resulting PET film having coating film with a spectroscopic colorimeter TC-1800MK-II (manufactured by Tokyopenshoku Co., Ltd.) showed L=99.6, a=−0.14, and b=0.78, and the haze measurement with a spectroscopic haze-meter TC-H3DPK-MK-II (manufactured by Tokyopenshoku Co., Ltd.) showed that total transmittance (Tt) was 99.6% and haze was 1.6. The surface resistance of the film measured by a surface resistance meter Hirestor UP (manufactured by Mitsubishi Chemical Corporation) was $3.5 \times 10^{12} \Omega/\square$ at a temperature of 24° C. in a relative humidity of 33%.

Comparative Example 7

A starting material aqueous solution was prepared by dissolving 371.6 g of potassium stannate in 686 g of water. The starting material aqueous solution was added with stirring in 1000 g of water heated to 50° C. together with 1880 g of 10 mass % nitric acid over 12 hours, and hydrolyzed while maintaining pH to 8.5 to obtain a tin oxide slurry. The condensate of the tin oxide colloidal particles was filtered off from the slurry, and the by-product salts were removed by fully washing with pure water, and then the cake of the tin oxide colloidal particles was dried at 110° C. In 228 g of the resulting dried material of the cake, 13 g of 20% orthophosphoric acid was soaked. Then, the cake was calcined in air at 350° C. for 3 hours, and further in air at 650° C. for 2 hours to obtain a phosphorus-doped tin oxide fine powders. The fluorescent X-ray analysis showed that the resulting phosphorus-doped tin oxide fine powders had a molar ratio of doped-phosphorus (P) to tin oxide ($SnO_2$) of 0.018. 10 g of the resulting phosphorus-doped tin oxide fine powders were mixed with 90 g of water, and water-ground with a ball-mill for 24 hours to obtain a phosphorus-doped tin oxide aqueous sol. The phosphorus-doped tin oxide aqueous sol had $SnO_2$ concentration of 10 mass %, a particle diameter with transmission electron microscope observation of 45 to 80 nm, and an average particle diameter based on a dynamic light scattering method of 265 nm. In addition, the sol was subjected to a measurement with a spectroscopic colorimeter TC-1800MK-II (manufactured by Tokyopenshoku Co., Ltd.) in an optical path length of 10 mm. As a result of it, the transmittance in the above-mentioned $SiO_2$ concentration at a wavelength of 600 nm was 0%.

TABLE 1

| Preparation of sol | Temperature of hydrothermal treatment (° C.) | P/$SiO_2$ (molar ratio) | Transmittance (%) | | |
|---|---|---|---|---|---|
| | | | Aqueous sol | Methanol sol | MEK sol |
| Example 1 | 150 | 0.021 | 88.5 | 76.3 | — |
| Example 2 | 150 | 0.021 | — | — | 78.7 |
| Example 3 | 150 | 0.021 | — | — | 42.9 |
| Example 6 | 150 | 0.081 | 87.3 | 78.2 | — |
| Example 8 | 200 | 0.020 | 62.5 | 56.6 | — |
| Example 10 | 240 | 0.019 | 55.5 | 54.5 | — |
| Comparative Example 1 | 150 | 0 | 88.0 | 78.1 | — |
| Comparative Example 3 | 90 | 0.004 | 87.0 | 77.2 | — |
| Comparative Example 5 | 150 | 0.002 | 86.8 | 77.9 | — |
| Comparative Example 7 | 650 (calcination) | 0.0018 | 0.0 | — | — |

TABLE 2

| Preparation of coating film | Used sol | Surface resistance ($\Omega/\square$) |
|---|---|---|
| Example 4 | Example 1 | $4 \times 10^9$ |
| Example 7 | Example 6 | $2 \times 10^9$ |
| Example 9 | Example 8 | $3 \times 10^9$ |
| Example 11 | Example 10 | $4 \times 10^9$ |
| Comparative Example 2 | Comparative Example 1 | $2.4 \times 10^{12}$ |
| Comparative Example 4 | Comparative Example 3 | $2 \times 10^{11}$ |
| Comparative Example 6 | Comparative Example 5 | $3.5 \times 10^{12}$ |

INDUSTRIAL APPLICABILITY

The particle diameter of the colloidal particles in the conductive tin oxide sol according to the present invention is extremely fine. The coating composition prepared by mixing the conductive tin oxide sol of the present invention and the binder can form a conductive coating film with a high transparency by coating it on a substrate. If the substrate is a transparent substrate, a material having a conductive or antistatic coating film can be produced without injuring the transparency of the substrate.

What is claimed is:

1. A process for producing a conductive tin oxide sol containing phosphorus-doped conductive tin oxide colloidal particles (A), wherein a sol prepared so as to have the colloidal particles (A) in a concentration of 10 mass % in the sol has a transmittance of 30% or more at a wavelength of 600 nm in an optical path length of 10 mm, comprising:

mixing a phosphorus compound in a tin oxide sol, and then subjecting to a hydrothermal treatment, wherein the tin oxide sol is prepared by adding metal tin and hydrogen peroxide in an aqueous solution of an organic acid keeping $H_2O_2$/Sn molar ratio of 2 to 3, and reacting.

2. The process for producing the conductive tin oxide sol according to claim 1, wherein a temperature for the hydrothermal treatment after mixing the phosphorus compound in the tin oxide sol is 100 to 350° C.

3. The process for producing the conductive tin oxide sol according to claim 1, wherein the metal tin and hydrogen peroxide are added and reacted so that tin oxide concentration in the aqueous solution of an organic acid is 40 mass % or less.

4. The process for producing the conductive tin oxide sol according to claim 1, wherein the organic acid is oxalic acid or an organic acid containing oxalic acid as a main component.

5. The process for producing the conductive tin oxide sol according to claim 1, wherein the phosphorus compound is at least one phosphorus compound selected from the group consisting of orthophosphoric acid, sodium dihydrogen phosphate, disodium hydrogen phosphate, trisodium phosphate, ammonium dihydrogen phosphate, diammonium hydrogen phosphate, triammonium phosphate, phosphorous acid, sodium dihydrogen phosphite, disodium hydrogen phosphite, trisodium phosphite, phosphorus trichloride and phosphorus pentachloride.

* * * * *